United States Patent [19]
Köhler et al.

[11] 3,723,551
[45] Mar. 27, 1973

[54] PROCESS FOR THE REMOVAL OF MINUTE QUANTITIES OF 1,3-CYCLOPENTADIENE FROM ISOPRENE AND/OR CYCLOPENTENE

[75] Inventors: H. Dieter Köhler; Günther Schnuchel; Helmut Scherb, all of Dormagen, Germany

[73] Assignee: Erdolchemie Gesellschaft mit beschrankter Haftung, Cologne, Germany

[22] Filed: Aug. 17, 1971

[21] Appl. No.: 172,576

[30] Foreign Application Priority Data

Aug. 21, 1970 Germany..................P 20 41 548.9

[52] U.S. Cl. .........................260/666 A, 260/681.5 R
[51] Int. Cl...................................C07c 7/12
[58] Field of Search.......................260/666 A, 681.5

[56] References Cited

UNITED STATES PATENTS

| | | | |
|---|---|---|---|
| 2,865,970 | 12/1958 | Thomas | 260/681.5 |
| 3,409,691 | 11/1968 | Small | 260/681.5 |
| 3,219,717 | 11/1965 | Niles | 260/666 |
| 2,922,822 | 1/1960 | Beach | 260/681.5 |
| 3,299,163 | 1/1967 | Zelinski | 260/681.5 |
| 2,982,796 | 5/1961 | Veal | 260/681.5 |
| 3,051,765 | 8/1962 | McCain | 260/666 |

*Primary Examiner*—Delbert E. Gantz
*Assistant Examiner*—C. E. Spresser
*Attorney*—Ralph D. Dinklage et al.

[57] ABSTRACT

1,3-cyclopentadiene is removed from isoprene and/or cyclopentene when present in amounts of less than 2,000 ppm by contact with a basic ion-exchanger which has been converted into the hydroxy form by preliminary treatment with a strong base.

4 Claims, No Drawings

PROCESS FOR THE REMOVAL OF MINUTE QUANTITIES OF 1,3-CYCLOPENTADIENE FROM ISOPRENE AND/OR CYCLOPENTENE

BACKGROUND

The invention relates to a process for the removal of minute quantities of 1,3-cyclopentadiene from isoprene and/or cyclopentene by means of basic ion exchangers.

It is well known that isoprene must satisfy the most stringent requirements as regards purity if it is to be used for the production of high quality polymers.

Minute quantities of 1,3-cyclopentadiene have a particularly disturbing effect on the polymerization of isoprene. Quantities in the region of 1 – 10 ppm reduce or completely inhibit the activity of the usual catalysts (see German Offenlegungsschrift 1 807 675).

Several methods of removing traces of 1,3-cyclopentadiene from isoprene have already been suggested. They are based on a chemical reaction which converts the 1,3-cyclopentadiene present in isoprene into some other compound while preserving the isoprene intact as far as possible. In this connection, there may be mentioned the reaction of 1,3-cyclopentadiene with maleic acid anhydride to form 3,6-endomethylene-1,2,3,6-tetrahydrophthalic acid (see N.V. Shcherbakova, C.A. 61, 6906 and C.A. 58, 447, C.A. 60, 1 0334), the reaction with carbonyl compounds with the formation of fulvenes (see Veal, C.A. 55; 2213), the reaction with metallic sodium in the form of a dispersion and after-treatment of isoprene with molecular sieves (U.S. Pat. 2,935,540) and the catalytic removal of 1,3-cyclopentadiene in contact with copper oxide or chromium oxide at elevated temperature and pressure (German Offenlegungsschrift 1 618 473). Extraction processes, e.g., with dimethyl formamide (German Offenlegungsschrift 1 807 675) are also available.

All the processes mentioned above have the disadvantage either that isoprene losses occur due to side reactions or that the processes are difficult and complicated to carry out on a commercial scale.

SUMMARY

It has now been found that minute quantities of 1,3-cyclopentadiene can easily be removed from isoprene and/or cyclopentene if isoprene and/or cyclopentene containing less than 2,000 ppm of 1,3-cyclopentadiene is brought into contact with a basic ion-exchanger which has been converted into the hydroxy form by preliminary treatment with a strong base.

DESCRIPTION

The process according to the invention is generally carried out at pressures of 1 to 5 ATM. and temperatures in the region of 0° to 50°C, preferably room temperature.

Strongly basic synthetic resin ion exchangers which contain ammonium groups, e.g., exchangers based on cross-linked aromatic vinyl polymers, are found to be suitable exchanger resins for the process according to the invention.

The exchangers used for the process according to the invention are preferably strongly basic anion exchangers which contain trimethyl ammonium and/or dimethyl-$\beta$-hydroxyethyl ammonium groups and which have been obtained by the polymerization or copolymerization of aromatic vinyl compounds with polyvinyl compounds. Polymers or copolymers which have been obtained by the polymerization or copolymerization of aromatic monovinyl compounds with aromatic polyvinyl compounds based on styrene and/or divinyl benzene and which contain trimethyl ammonium and/or dimethyl-$\beta$-hydroxyethyl ammonium groups are particularly suitable for the process of the invention.

It is especially advantageous to use macroreticular ion exchanger resins which have an exceptionally high porosity and surface area in a non-aqueous or partly aqueous medium. The average pore diameter of the macroreticular exchanger resins used for the process of the invention is advantageously 5 to 180 m$\mu$, preferably 20 to 80 m$\mu$, and the particle size is 0.04 to 1.5 mm, preferably 0.30 to 0.85 mm. Types of these exchanger resins which are preferred for the process and used in the examples are described, e.g., in "Ionenaustauscher" by K. Dörfner, Publishers Walter de Gruyter, Berlin 1964, 2nd edition, top of page 17 and last line on page 27.

It is essential for successfully carrying out the process of the invention that the ion exchanger should not be charged with any foreign substances since neither paraffins nor olefines nor dienes other than 1,3-cyclopentadiene are retained by ion exchangers. Comparison tests have shown that the detectable concentrations of paraffins, olefines and dienes with the exception of cyclopentadiene were the same in the starting material and in the material which had been purified by means of the ion exchanger.

These so-called basic ion exchangers are generally present in the chloride form. They must then, of course, be converted into the hydroxy form in the usual manner, e.g., by treating them with strong bases. The strong bases may be alcoholic solutions but are preferably aqueous solutions of alkali metal hydroxide (preferably NaOH, KOH). For conversion into the hydroxy form which is necessary for carrying out the process of the invention, the ion exchanger is treated with twice its volume of distilled water in the usual manner for about 30 minutes and then washed with 10 times its volume of distilled water until it is colorless and free from lighter foreign particles floating at the top. After removal of the supernatant liquid by decanting, the ion exchanger is stirred into twice its volume of 1.5 N sodium hydroxide solution (aqueous) for 30 minutes and then washed with distilled water until the water has a conductivity of 0.65 $\mu$S. The ion exchanger is then filtered with suction until dry and washed with twice its volume of methanol, the methanol is removed by suction filtration and the ion exchanger is dried at 35°C. until it is pale yellow.

A chromatography column is then half filled with isoprene or cyclopentene free from cyclopentadiene and the ion exchanger is slowly introduced. The ion exchanger has preferably previously been treated with pure isoprene or cyclopentene in order to achieve a more efficient wetting. The ion exchanger is washed back with isoprene or cyclopentene which is free from cyclopentadiene until all the air bubbles have escaped and the exchanger is freely purable.

It is a particular advantage of the process that the basic ion exchanger charged with 1,3-cyclopentadiene can be completely regenerated in a conventional manner. For this purpose, the ion exchangers used are blown dry with nitrogen and brought into contact with 6 percent aqueous sodium hydroxide solution for 4 hours, washed with distilled water until neutral and kept in contact with 0.1 N aqueous sodium chloride solution for up to 3 hours. The sodium hydroxide solution obtained after the last treatment by exchange of chloride ions for hydroxyl ions is determined by titration with 0.1 N aqueous hydrochloric acid. The result is compared with that obtained with a portion of ion exchanger which has not yet been used for the removal of 1,3-cyclopentadiene and which has previously been subjected to the same treatments as are required for the regeneration of an ion exchanger which has already been used for the removal of 1,3-cyclopentadiene. The used basic ion exchangers are regenerated to between 90 percent and 95 percent of the capacity of an unused ion exchanger. According to a preferred embodiment of the process of the invention, the operation is carried out continuously (battery of ion exchangers) and the exhaused ion exchanger is regenerated with dilute aqueous NaOH.

The isoprene and/or cyclopentene used for the process preferably contains only 1 – 100 ppm of 1,3-cyclopentadiene. The process is preferably carried out within a temperature range of 10° to 30°C. but especially at the prevailing room temperature. The process according to the invention may also be carried out at elevated temperatures of 30° to 50°C. under pressure of 1 to 5 bar in order to ensure a liquid phase.

The particularly highly purified isoprene obtainable by the process according to the invention is eminently suitable e.g., for the preparation of polyisoprene or polycyclopentene.

EXAMPLE 1

781 ml of the basic ion exchanger which has an exchange capacity of 1.8 m Val/g are introduced into a glass column 1,050 mm in length and 34 mm in diameter to a filling height of 860 mm. An isoprene ($d^{20}$ 0.685) containing 70 ppm of 1,3-cyclopentadiene is introduced over this ion exchanger at a linear rate of flow of 1.1 mm/min and in a quantity of 60 ml per hour. The temperature of the column can be maintained at 20°C. by means of a cooling jacket in order to prevent isoprene losses by evaporation and to prevent the formation of bubbles in the column. When 36.71 liters of isoprene have been passed through the apparatus, the isoprene discharged from the apparatus contains less than 1 ppm of 1,3-cyclopentadiene. The ion exchanger has absorbed 1.74 g of 1,3-cyclopentadiene, corresponding to a utilization of the exchanger capacity of 6 percent.

EXAMPLE 2

781 ml = 444 g of a basic ion exchanger having a theoretical exchange capacity of 1.8 m Val/g are introduced into a glass column as in Example 1 of length 1,000 mm and diameter 34 mm to a filling height of 960 mm. When 54.28 liters of an isoprene ($d^{20}$ 0.685) containing 12 ppm of 1,3-cyclopentadiene had been introduced over the ion exchanger at a linear flow velocity of 3.8 mm/min, the isoprene discharged from the apparatus contained less then 1 ppm of 1,3-cyclopentadiene. The exchanger absorbed 0.431 g of 1,3-dicyclopentadiene = 1.5 percent of the theoretical capacity.

The exchange capacity of the basic ion exchangers used may be determined as follows:

a. 10 g of a basic ion exchanger having a theoretical exchange capacity of 1.8 m Val/g which is fresh from the factory, in other words unused in the sense of the invention, are stirred with 100 ml of a 6 percent aqueous sodium hydroxide solution for 4 hours and then washed with distilled water until neutral and stirred with 200 ml of a 0.1 N sodium chloride solution for 3 hours. The sodium hydroxide solution formed in the last step of the process is titrated in an aliquot portion of the sodium chloride solution against 0.1 N acid. The exchange capacity is 1.09 m Val/g.

b. 10 g of a basic ion exchanger which has a theoretical exchange capacity of 1.8 m Val/g and which has been used in the sense of the invention in Example 1 is treated as described under (a). The exchange capacity is 0.98 m Val/g = 90 percent of the capacity of the unused basic ion exchanger treated according to (a).

c. 10 g of a basic ion exchanger having a theoretical exchange capacity of 1.8 m Val/g which has been used in the sense of the invention in Example 2 is treated as described under (a). The exchange capacity is 1.01 m Val/g = 93 percent of the capacity of the unused basic ion exchanger treated according to (a).

EXAMPLE 3

780 ml of a basic ion exchanger having a theoretical exchange capacity of 1.8 m Val/g are introduced to a filling height of 860 mm into a glass column which has a length of 1050 mm and a diameter of 34 mm. A cyclopentene ($d^{20}$ 0.7705) containing 60 ppm of 1,3-cyclopentadiene is introduced over this ion exchanger at a rate of 60 ml per hour and a linear flow velocity of 1.1 mm/min. The temperature of the column can be controlled by means of a cooling jacket in order to prevent evaporation losses of cyclopentene and the formation of bubbles in the column. When 37.9 liters of cyclopentene have been passed through the apparatus, the cyclopentene discharged contains 1 ppm of 1,3-cyclopentadiene. The ion exchanger has absorbed 1.75 g of 1,3-cyclopentadiene, corresponding to a utilization of the ion exchanger capacity of 6 percent.

What is claimed is:

1. Process for the removal of minute quantities of 1,3-cyclopentadiene from isoprene and/or cyclopentene which comprises contacting isoprene and/or cyclopentene which contains less than 2,000 ppm of 1,3-cyclopentadiene with a basic ion exchanger which has been converted into the hydroxy form by a preliminary treatment with a strong base.

2. Process of claim 1 wherein the ion exchanger used is an anion exchanger based on styrene and/or divinyl benzene which contains ammonium groups.

3. Process of claim 1 wherein a macroreticular ion exchanger is used.

4. Process of claim 1 wherein the treatment of isoprene and/or cyclopentene is carried out in the liquid phase at a temperature of 0° to 50°C. and a pressure of 1 to 5 ATM.

* * * * *